United States Patent
Hao et al.

(10) Patent No.: US 12,553,704 B2
(45) Date of Patent: Feb. 17, 2026

(54) METHOD AND SYSTEM FOR REAL-TIME MONITORING OF WALL THINNING AND ASCERTAINING OF WALL ATTRIBUTES USING FIBER Bragg GRATING (FBG) SENSORS

(71) Applicants: AGENCY FOR SCIENCE, TECHNOLOGY AND RESEARCH, Singapore (SG); SEMBCORP INDUSTRIES LTD., Singapore (SG)

(72) Inventors: Jianzhong Hao, Singapore (SG); Wenyu Jiang, Singapore (SG); Yixin Wang, Singapore (SG); Aayush Madan, Singapore (SG); Shili Xiang, Singapore (SG); Jun Long Lim, Singapore (SG); Ouyang Liu, Singapore (SG); Yongwei Zhu, Singapore (SG); Kai Wu, Singapore (SG); Jiliang Eugene Phua, Singapore (SG); Rebecca Yen-Ni Wong, Singapore (SG); Muralidharan S/O Paramsothy, Singapore (SG); Hui Dong, Singapore (SG); Chuen Yuen Henry Wong, Singapore (SG); Wen Chen, Singapore (SG); Haiyan Shu, Singapore (SG)

(73) Assignees: AGENCY FOR SCIENCE, TECHNOLOGY AND RESEARCH, Singapore (SG); SEMBCORP INDUSTRIES LTD, Singapore (SG)

( * ) Notice: Subject to any disclaimer, the term of this patent is extended or adjusted under 35 U.S.C. 154(b) by 706 days.

(21) Appl. No.: 17/790,390

(22) PCT Filed: Dec. 31, 2019

(86) PCT No.: PCT/SG2019/050652
§ 371 (c)(1),
(2) Date: Jun. 30, 2022

(87) PCT Pub. No.: WO2021/137748
PCT Pub. Date: Jul. 8, 2021

(65) Prior Publication Data
US 2023/0057398 A1    Feb. 23, 2023

(51) Int. Cl.
*G01B 11/06* (2006.01)
*F17C 13/02* (2006.01)
*G01D 5/353* (2006.01)

(52) U.S. Cl.
CPC .............. *G01B 11/06* (2013.01); *F17C 13/02* (2013.01); *G01D 5/35316* (2013.01); *F17C 2250/0668* (2013.01); *F17C 2260/017* (2013.01)

(58) Field of Classification Search
CPC .. G01B 11/06; F17C 13/02; F17C 2250/0668; F17C 2260/017; G01D 5/35316
See application file for complete search history.

(56) References Cited

U.S. PATENT DOCUMENTS 6,000,288 A * 12/1999 Kwun .................. G01N 29/449
                                                    73/602
7,387,031 B1 * 6/2008 Perrin .................... G01N 3/567
                                                    73/820

(Continued)

FOREIGN PATENT DOCUMENTS

| CN | 102564334 A | 7/2012 |
| CN | 104613885 A | 5/2015 |

(Continued)

*Primary Examiner* — Catherine T. Rastovski
*Assistant Examiner* — Sharad Timilsina

(57) ABSTRACT

The present disclosure relates to at least one method for ascertaining at least one attribute of pressure vessel wall. A method comprises: while a pressure vessel, which comprises a wall having an outer surface and an inner surface, is (Continued)

operating: ascertaining a current wavelength shift of a first fiber Bragg grating (FBG) sensor disposed at a first outer surface location on the pressure vessel; and ascertaining a current thickness of the wall at the first outer surface location by: computing a vector based on a time series of the current wavelength shift, or a derivative of the time series, or a derivative of the current wavelength shift; providing the vector to a predetermined regression model; and using the regression model, ascertaining the current thickness of the wall.

15 Claims, 10 Drawing Sheets

(56) References Cited

U.S. PATENT DOCUMENTS

| | | |
|---|---|---|
| 7,912,334 B2 | 3/2011 | Xia et al. |
| 8,727,613 B2 | 5/2014 | Mihailov |
| 8,941,821 B2 | 1/2015 | Coupe et al. |
| 2002/0194932 A1* | 12/2002 | Gysling .................. G01F 1/34 73/861.42 |
| 2008/0047662 A1* | 2/2008 | Dria ........................ G01B 7/16 248/542 |
| 2012/0099097 A1* | 4/2012 | Coupe ................... G01B 11/06 356/32 |
| 2012/0143522 A1* | 6/2012 | Chen ..................... G01L 1/2281 702/42 |
| 2015/0285705 A1* | 10/2015 | Kumar ................ G01M 5/0033 356/73.1 |

FOREIGN PATENT DOCUMENTS

| | | |
|---|---|---|
| WO | 2014100523 A1 | 6/2014 |
| WO | 2019123492 A1 | 6/2019 |

* cited by examiner

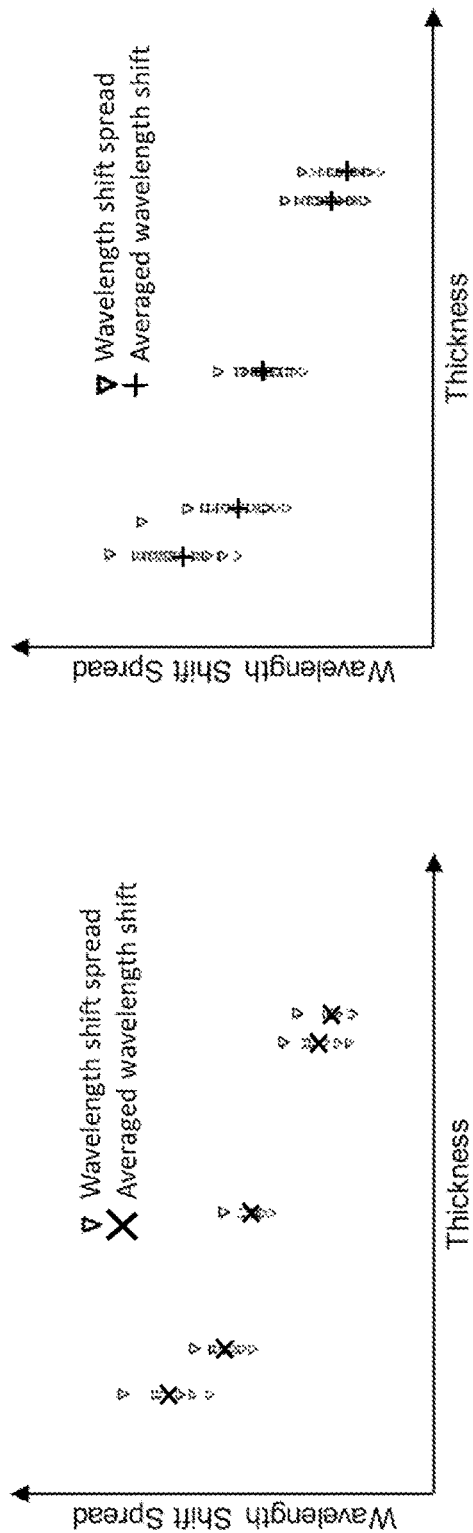
Figure 2A
Figure 2B
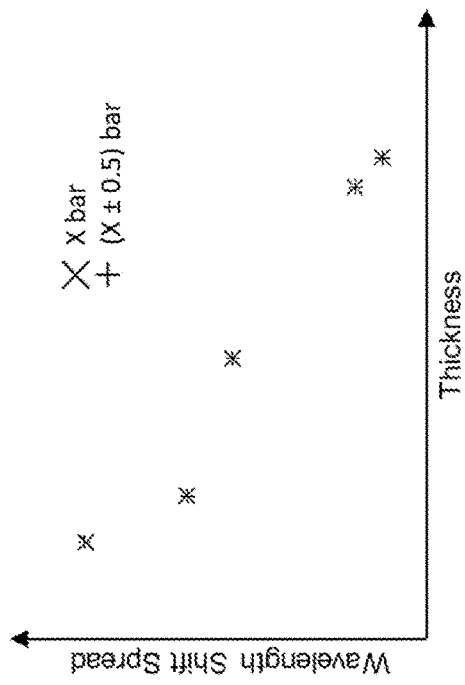
Figure 2C

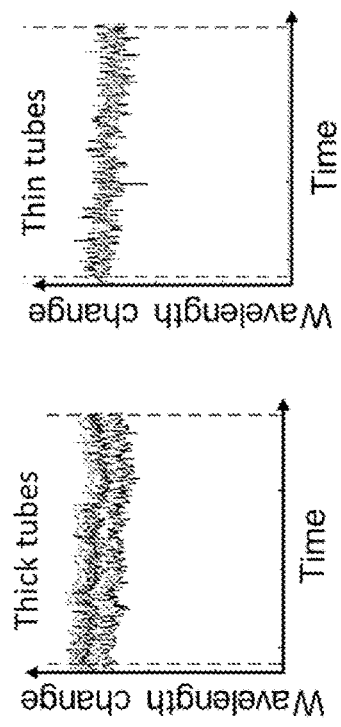
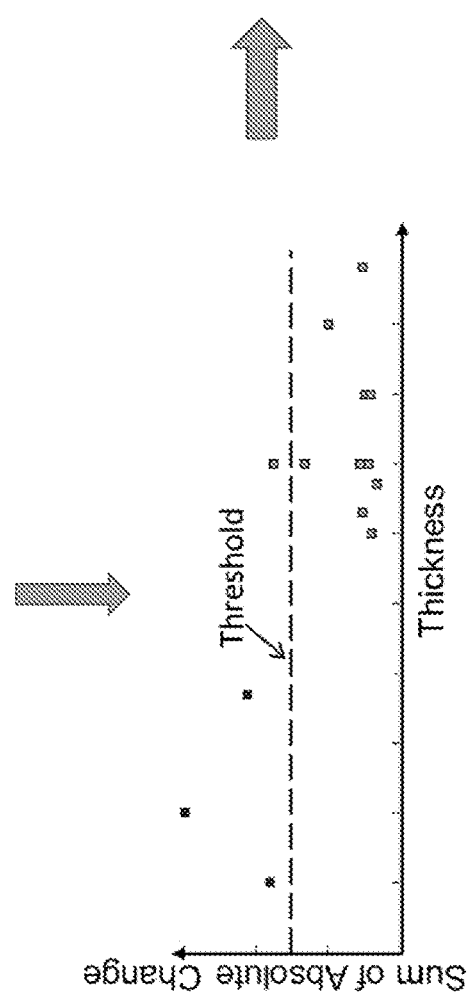
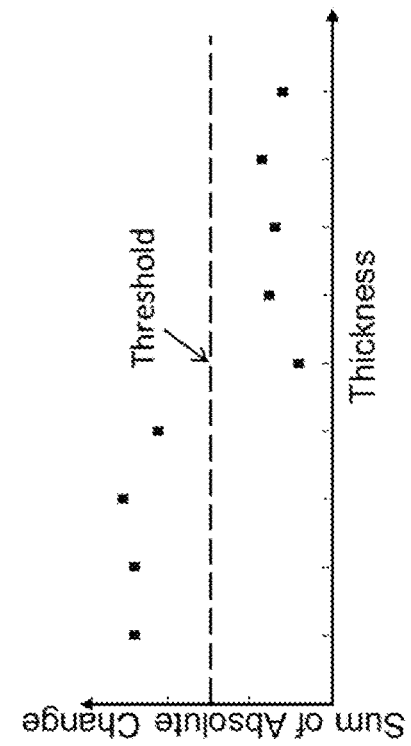
Figure 4A
Figure 4B
Figure 4C (before quantization of thickness)
Figure 4D (after quantization of thickness)

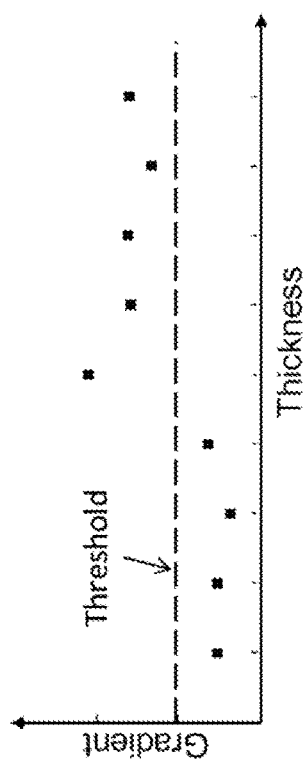
Figure 6D
(after quantization of thickness)
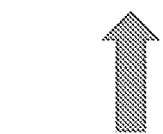
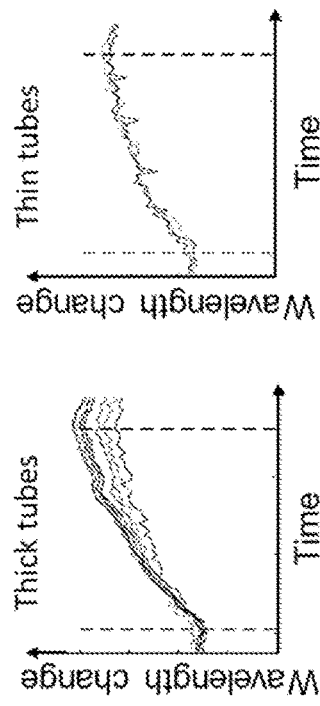
Figure 6A
Figure 6B
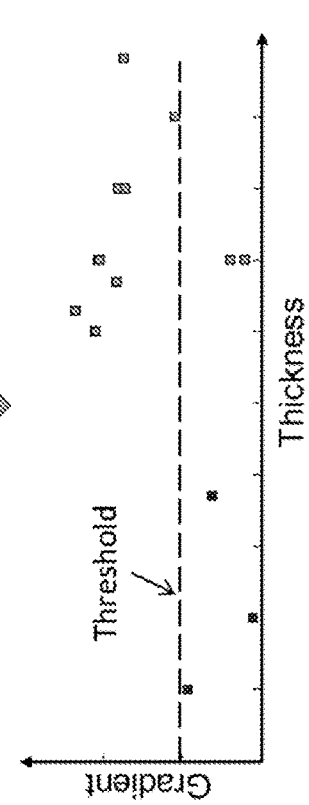
Figure 6C
(before quantization of thickness)

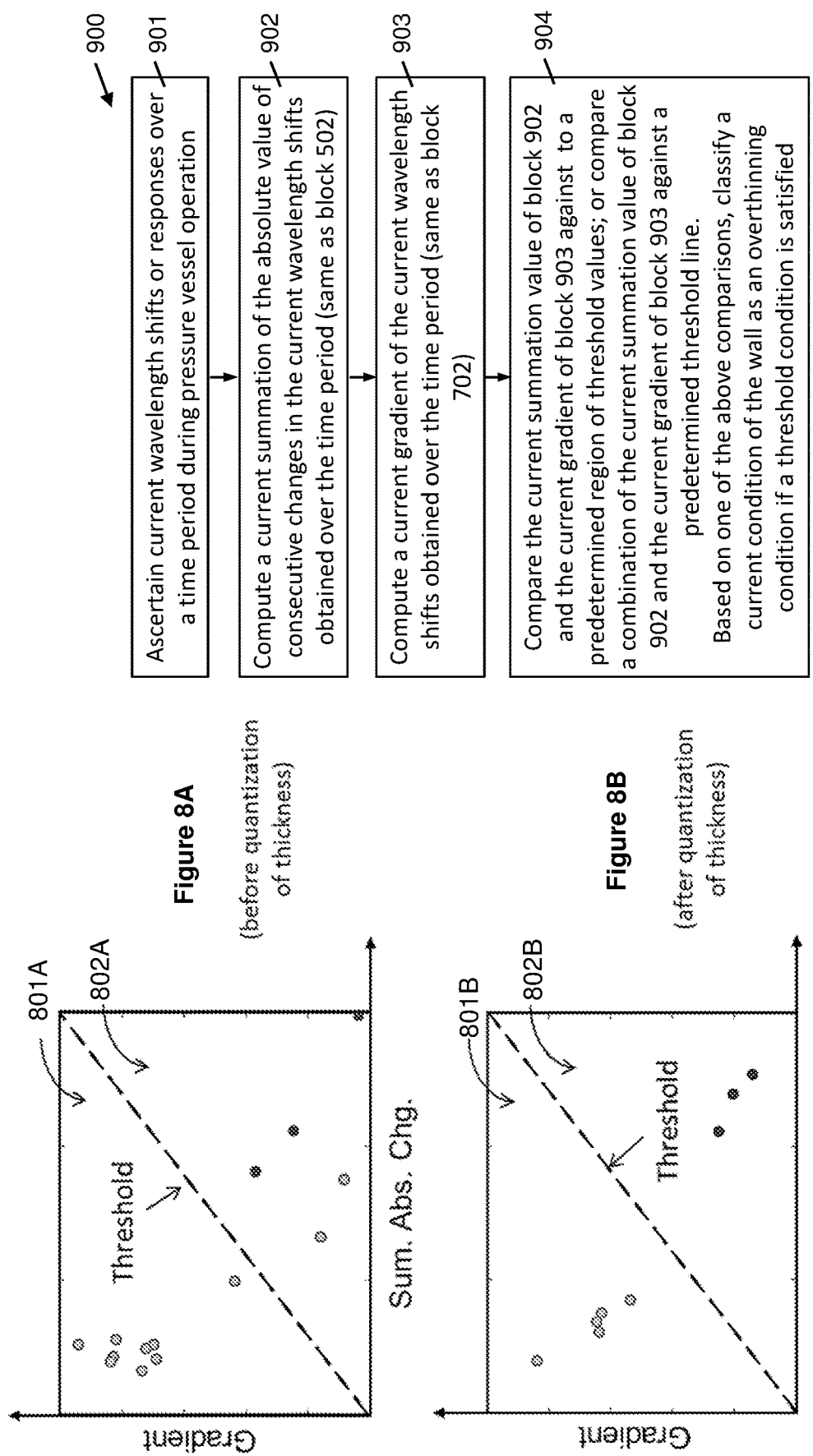

METHOD AND SYSTEM FOR REAL-TIME MONITORING OF WALL THINNING AND ASCERTAINING OF WALL ATTRIBUTES USING FIBER Bragg GRATING (FBG) SENSORS

TECHNICAL FIELD

This disclosure generally relates to non-destructive condition monitoring structural integrity, e.g., thinning, of walls of pressure vessels which may operate in harsh environment, e.g. high temperature and/or pressure, particularly of ascertaining attributes of pressure vessel wall, e.g. classifying current condition of pressure vessel wall and estimating current thickness of pressure vessel wall.

BACKGROUND

Oil and gas refineries, petroleum industries, energy, or power industries, etc., deploy tube boilers in their steam-generating plants, high-temperature environment or in combined cycle gas-turbine plants. Structural defects in the boiler tubes are usually monitored manually mostly by using the ultrasonic thickness gauge (UTG) with B-scan, cleaning and visual inspection. To carry out scheduled preventive maintenance and unscheduled maintenance for an undetected failure, the primary standard is to perform a random check of a small percentage of the total tubes involved by using spot/UTG scanning. The maintenance policy requires the shutting down of the plant, which is time-consuming, labour-intensive, and cost ineffective. A real-time condition monitoring scheme is highly desirable in a real application to speed up and automate the maintenance process.

SUMMARY

According to a first aspect of the disclosure, a method for ascertaining at least one attribute of pressure vessel wall is provided. The method comprises:
while a pressure vessel, which comprises a wall having an outer surface and an inner surface, is operating:
  ascertaining a current wavelength shift of a first fiber Bragg grating (FBG) sensor disposed at a first outer surface location on the pressure vessel; and
  ascertaining a current thickness of the wall at the first outer surface location by:
    computing a vector based on a time series of the current wavelength shift, or a derivative of the time series, or a derivative of the current wavelength shift;
    providing the vector to a predetermined regression model; and
    using the regression model, ascertaining the current thickness of the wall.

According to a second aspect of the disclosure, a system for ascertaining at least one attribute of pressure vessel wall is provided. The system comprises:
a plurality of fiber Bragg grating (FBG) sensors which are disposed at outer surface locations on a pressure vessel which comprises a wall having an outer surface and an inner surface, wherein the FBG sensors include a first FBG sensor disposed at a first outer surface location on the pressure vessel; and
a computing processor or workstation which is communicably coupled via a communication network to the FBG sensors, wherein the computing processor or workstation is configured to:
  while the pressure vessel is operating:
    ascertain a current wavelength shift of the first FBG; and
    ascertain a current thickness of the wall at the first outer surface location by:
      computing a vector based on a time series of the current wavelength shift, or a derivative of the time series or a derivative of the current wavelength shift;
      providing the vector to a predetermined regression model; and
      using the regression model, ascertaining the current thickness of the wall.

BRIEF DESCRIPTION OF DRAWINGS

FIG. 2A shows wavelength shift spread and averaged wavelength shift against wall thickness at a predetermined pressure condition, e.g. X bar;

FIG. 2B shows wavelength shift spread and averaged wavelength shift against wall thickness within a range of the predetermined pressure condition of FIG. 2A, e.g. (X±0.5) bar;

FIG. 2C shows averaged wavelength shifts against wall thickness, as derived from FIGS. 2A and 2B;

FIG. 4A shows oscillations or fluctuations of wavelength shifts with respect to time for larger wall thickness (thick tubes);

FIG. 4B shows oscillations or fluctuations of wavelength shifts or changes with respect to time for smaller wall thickness (thin tubes);

FIG. 4C, derived from FIGS. 4A and 4B, shows summation of absolute value of consecutive changes in wavelength shifts with respect to wall thickness (before quantization of thickness);

FIG. 4D shows the summation values shown in FIG. 4C after quantization of thickness;

FIG. 6A shows oscillations or fluctuations of wavelength shifts with respect to time for larger wall thickness (thick tubes);

FIG. 6B shows oscillations or fluctuations of wavelength shifts with respect to time for smaller wall thickness (thin tubes);

FIG. 6C, derived from FIGS. 6A and 6B, shows gradient of wavelength shifts with respect to wall thickness (before quantization of thickness);

FIG. 6D shows the gradients shown in FIG. 6C after quantization of thickness;

FIGS. 8A and 8B show gradient of wavelength shifts with respect to sum-of-absolute-changes in wavelength shifts, before and after quantization of thickness respectively;

FIG. 9 shows a flow chart describing a method classifying current condition of wall;

DETAILED DESCRIPTION

Figure 1:
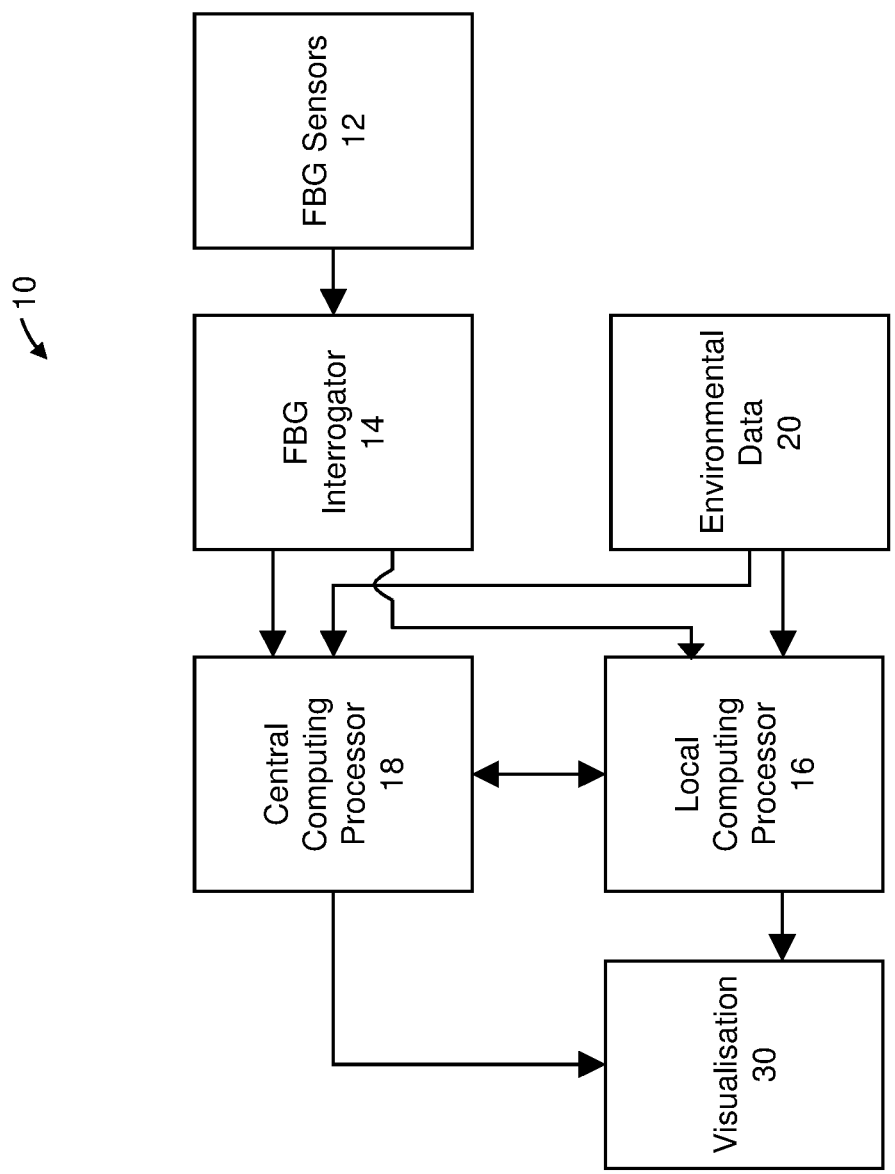
FIG. 1 shows a schematic diagram of a system according to some embodiments.

In the following description, numerous specific details are set forth in order to provide a thorough understanding of various illustrative embodiments of the invention. It will be understood, however, to one skilled in the art, that embodiments of the invention may be practiced without some or all of these specific details. In other instances, well known process operations have not been described in detail in order not to unnecessarily obscure pertinent aspects of embodiments being described. In the drawings, like reference numerals refer to same or similar functionalities or features throughout the several views.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, including examples and claims, the articles "a", "an" and "the" as used with regard to a feature or element include a reference to one or more of the features or elements. The terms "comprising," "including," and "having" are intended to be open-ended and mean that there may be additional features or elements other than the listed ones. Identifiers such as "first", "second" and "third" are used merely as labels, and are not intended to impose numerical requirements on their objects, nor construed in a manner imposing any relative position or time sequence between limitations. The term "and/or" includes any and all combinations of one or more of the associated listed items. Yet furthermore, the term "coupled" and related terms are used in an operational sense and are not necessarily limited to a direct physical connection or coupling. Thus, for example, two devices may be coupled directly, or via one or more intermediary devices. In certain examples, devices may be suitably coupled such that information or signal can be passed there between, while not sharing any physical connection with each other. For example, two devices may be communicably coupled via a wired or wireless connection. Based on the present disclosure, a person of ordinary skill in the art will appreciate a variety of ways in which coupling exists in accordance with the aforementioned definition. The term "pressure vessel" generally includes a container or vessel for containing any substance under pressure, and may further include container or vessel hold containing fluid regardless of pressure conditions. Such container or vessel may be fully enclosed or partially enclosed. Examples of "pressure vessel" include, but are not limited to, boiler, heat exchanger, tube, pipe, etc. Throughout the description and drawings where the term "tube" and related terms are used or illustrated, it is to be appreciated that the relevant description and drawings are applicable to "pressure vessel" and its examples, and are not solely restricted to applications relating to "tube". Identifiers such as "previous" and "current" may define a chronological order between limitations but do not necessarily imply consecutive occurrence of the limitations; furthermore, the identifier "current" may not necessarily imply real-time occurrence. The term "substantially" and "about" are to be given their ordinary and customary meaning to a person skilled in the art. They may refer without limitation to a sufficient amount that provides a desired function. For example, if a reference sensor which is disposed in a direction at 85° or 88° or 92° or 95° to a direction of a FBG sensor facilitates use of the reference sensor to remove unwanted component, the term "substantially" when used in "the reference sensor is disposed in a direction which is substantially orthogonal to a direction of a FBG sensor" would be understood to include a direction offset of 90° and at least the aforementioned values. Where the term "quantization" is used, it is to be given its ordinary and customary meaning to a person skilled in the art. For example, for quantization interval of d, X-axis values of t are enumerated from $t_{min}$ to $t_{max}$ at stepping of d, and each t covers and averages the Y-axis values of data points within thickness range of (t−d, t+d).

According to aspects of the disclosure, systems and methods are provided for ascertaining at least one attribute of pressure vessel wall, e.g. tube wall, using optical fiber Bragg grating (FBG) sensors. These attribute(s) may include, but not limited to, a condition or state of the wall, and a thickness of the wall. Depending on applications, environmental temperature of the pressure vessel may be room temperature (25° C.), below room temperature, or above room temperature, e.g. up to 500° C. or 700° C. or more. Pressure inside the pressure vessel may be above 1 atm. Multiple FBG sensors are installed at critical positions on the exterior wall surface of the pressure vessel, e.g. at a bend or non-bend portions of the tube. If corrosion (waterside or any other type) of the pressure vessel occurs at these specific positions, under constant environmental conditions, e.g. temperature, internal gas flow, pressure, etc., the corrosion may result in a change in the wall thickness and a change in the strain of the pressure vessel material at these specific positions. Each FBG sensor continuously captures these gradual strain changes over a period of time. Big data from these sensors may be collected and stored, and a predictive model can be trained using such big data together with known or predetermined thickness values, e.g. measured using ultrasonic thickness gauge or B-scan. Then, a prediction from the model, based on live data, may be used to monitor the pressure vessel in real-time. Furthermore, methods of the disclosure may broadly classify a condition of the pressure vessel as non-overthinning (thick) or overthinning (thin) from the sensor response data and/or estimate or ascertain the wall thickness by using a set of reference values.

According to one aspect of the disclosure, a system for ascertaining at least one attribute of pressure vessel wall, e.g. tube wall, is provided. The system generally comprises: a plurality of FBG sensors disposed at outer surface locations on a pressure vessel, e.g. tube, one or more computing processors or workstations, and a communication network which communicably couples between the FBG sensors and the computing processor(s) or workstation(s).

FBG sensors are installed at pressure vessels, e.g. tubes, which are to be monitored. These tubes may be generally closely-spaced small-diameter bend tubes that operate in any environment including, but not limited to, harsh environment conditions, e.g. high temperature and/or pressure. These pressure vessels may be employed and operated in equipment such as, but not limited to, boilers, wind turbines, exhaust controls, power-plant controls, and undersea environment.

FBG sensors may be disposed at various locations on the outer surface of the pressure vessel. A pressure vessel, e.g. tube, generally includes a wall having an inner surface forming a fluid channel and an outer surface arranged opposed to the inner surface, wherein the inner surface, during operation, contacts a fluid flowing through the channel while the outer surface generally does not contact the fluid that flows through the channel. Under constant conditions, such as temperature, internal gas flow, pressure, etc., if corrosion of pressure vessel occurs and results in a change of wall thickness at the inner surface, its strain on the outer surface of the pressure vessel will change accordingly. As the FBG sensors may be surface-mounted on the outer surface of the pressure vessel, when other conditions are constant, the FBG sensor can directly measure and quantify the strain changes on the vessel's outer surface. If long-term monitoring of the measurement of strain and temperature of a pressure vessel shows consistent reading, this implies the pressure vessel is in good condition and that there is no overthinning induced, i.e. no over-reduction in wall thickness. On the other hand, when overthinning occurs, the strain reading will change gradually and eventually push the readings into abnormal levels which would trigger alarms. As corroded parts, shape, size, and depth of the pressure vessel may not be constant along surfaces of the pressure vessel, a plurality of FBG sensors are disposed at, e.g. on, outer surface locations of the pressure vessel to measure changes in the strain distribution of the outer surface of the pressure vessel. Such locations are appropriately selected based on points of interest for monitoring the thickness reduction or induced thinning in the pressure vessel. These locations include bend portion(s) and/or straight portion(s) of the pressure vessel. In some embodiments, an angle of the bend may be acute, orthogonal, or obtuse. In some other embodiments, the angle of the bend is about 45 degrees. In yet other embodiments, the bend includes an apex of a U-bend or U-shape portion.

Various ways of disposing FBG sensors at outer surface locations of the pressure vessel may be envisaged. The FBG sensors may be installed, mounted or secured over the outer surface of the pressure vessel by suitable adhesive, composite, and/or mechanically mounted using a solder or spot weld joint. The choice of sensor installation depends on the arrangement of the pressure vessel and operating conditions of the environment. The operating conditions generally relates to the environment variables which include, but are not limited to, surrounding flue gas temperature, water/steam flow-rate, pressure, and temperature, vibrations (if present), etc.

FBGs are capable of being embedded underneath metallic structures for measuring the structural integrity parameters, hence providing a useful monitoring mechanism in an inaccessible environment.

Depending on geometry and dimension of pressure vessel, a suitable length of grating with a well-defined spectrum can be used. The grating pitch becomes uneven when a grating exceeds a particular length when it is attached to a curved surface. This may cause a chirping effect in wavelength spectrum of the grating.

The communication network may comprise various optical, electrical and/or electronic devices configured to transmit data and/or signals produced by the FBG sensors to a computing processors(s) or workstation(s), and may be further configured to process such data and/or signals prior to or during this transmission.

The computing processor(s) may be communicably coupled to one or more units of memory storage for storing computer-executable code for performing operations in accordance with aspects of the present disclosure, display unit for displaying outputs generated by performing the operations, etc. The computing processor(s) is configured to receive and process data to monitor, classify and/or ascertain reduction of wall thickness in pressure vessel. The computing processor(s) may be provided as part of a cloud-based network of memory storage(s), processor(s) and display device(s), or as a computing workstation, e.g. laptop computer, personal computer.

FIG. 1 shows a schematic diagram of the aforesaid system 10 according to some embodiments. As shown, FBG sensors 12 are disposed on a pressure vessel, e.g. high pressure evaporator and/or high pressure economizer tubes. The FBG sensors 12 are communicably coupled to an FBG interrogator 14 which is to receive light pulses from the FBG sensors 12 and is configured to allow reading of data from connected sensors 12 in real-time. The FBG interrogator 14 is communicably coupled to computer processors 16, 18. The FBG interrogator 14, in some embodiments, may be communicably coupled to one or more computing processors 16, 18 via a communications network (such as the Internet, or an internal network). The local computing processor 16 is communicably coupled to the interrogator 14 and may be configured to pre-process data received from the interrogator 14 and, optionally, from another source 20, e.g. environment data such as but not limited to temperature, pressure and flow rate at various locations of a system comprising the pressure vessel. The central computing processor 18 is communicably coupled to the local computing processor 16 and may receive the pre-processed data therefrom. The central computing processor 18 is communicably coupled to the FBG interrogator 14 and may receive sensor data, e.g. strain and temperature information of the pressure vessel, from the FBG interrogator 14. The central computing processor 18 may be further configured to receive environmental data source 20. The central computing processor 18 is configured to process data from FBG interrogator 14, environmental data source 20, local computing processor 16, or any combination thereof, to ascertain attribute of pressure vessel wall; this operation will be explained in later paragraphs. The central computing processor 18 and, optionally, the local computing processor 16 are communicably coupled to a visualisation device 30, e.g. display unit, and/or other output device configured to present outputs from the local and/or central computing processor 16, 18.

It is to be appreciated that the local and/or central computing processors 16, 18 may, in some embodiments, refer to edge computing and cloud computing, respectively. The central computing processor 18 and/or local computing processor 16 may, in some embodiments, be provided as part of a cloud-based platform or workstation. It is to be appreciated that the local computing processor 16 may, in some embodiments, be omitted in which the data from FBG interrogator 14 is processed by the central computing processor 18 without pre-processing elsewhere. Furthermore, it is to be appreciated that some of the aforementioned components of system 10 may be omitted or substituted in other embodiments.

An FBG sensor manifests its strain sensing via its peak wavelength in its response. Wavelength shift (alternatively, wavelength response) is defined as wavelength change for an FBG sensor with respect to the measured peak wavelength for that sensor at room temperature (e.g. 25° C.) and atmosphere of 1 bar (in this document, by default, bar means bara) baseline condition (e.g. after mounting and room temperature curing of its securing adhesive).

In a non-limiting example wherein multiple FBG sensors are disposed along a U-bend tube at multiple locations, including an apex position, on the outer surface of the tube, the FBG sensors at different points of consideration along the U-bend tube exhibited different responses which can be processed to provide a method or tool for distinguishing the different available thicknesses. The thickest point, where no thinning has occurred, has smallest wavelength shift for any given pressure while the thinnest point, where maximum thinning has occurred, has the maximum wavelength shift. In other words, as wall thickness of tube increases, wavelength shift or response decreases.

According to aspects of the disclosure, various methods for ascertaining one or more attributes of pressure vessel wall, e.g. tube wall, including classifying and/or ascertaining (estimating) wall thickness of pressure vessel, particularly remaining vessel wall thickness after corrosion, are provided according to various embodiments.

Attributes of pressure vessel wall may be ascertained and/or classified using mappings. In some embodiments, mappings between wall thickness of pressure vessel and sensor response (wavelength shifts) at different pressure levels are obtained such as by a signal processing software. Based on the mappings and/or analysis thereof, wall thickness of pressure vessel may be ascertained by calculating the correlation coefficient (CC) between the wavelength shift and thickness value at a given pressure.

At multiple pressure conditions, data from all test ramps at each pressure condition may be provided in one or more scatter plots which may be generalised by FIGS. 2A and 2B. FIG. 2A shows wavelength shifts for each wall thickness value at pressure condition X bar. It is to be appreciated that the spread of data points at each unique thickness may be due to variability in sensor measurements across test ramps, potentially due to certain rate-dependent hysteresis effects when rate of pressure changes may be rapid. Despite this spread, the correlation coefficient in this case is still rather strong. FIG. 2A accordingly suggests a strong correlation between wall thickness and wavelength shift, which is concurred by the visually noticeable relationship between them. FIG. 2B shows wavelength shifts for each wall thickness value at pressure condition (X±0.5) bar, i.e. for a pressure range of (X−0.5) bar to (X+0.5) bar with a step size of 0.5 bar. FIG. 2B shows a larger data spread at each wall thickness as compared to FIG. 2A, but a reduced but still significant correlation coefficient.

As mappings between wall thickness and wavelength shift appear visually less precise when relaxing to (X±0.5) bar, averaged wavelength shift at a given thickness over all test ramps as shown in FIGS. 2A and 2B is computed. By combining averages of scatter plots from both FIGS. 2A and 2B, the result is shown in FIG. 2C in which the averaged scatter plots for both X bars and (X±0.5) bars are nearly identical. Accordingly, even when pressure changes in real operating environments, as long as the average pressure is stable, subject to a moderate number of measurements, the averaged wavelength shift is highly consistent and repeatable. This suggests that any existing hysteresis across test ramps would be effectively smoothed out and reduced by multiple measurements and averaging.

Figure 3:
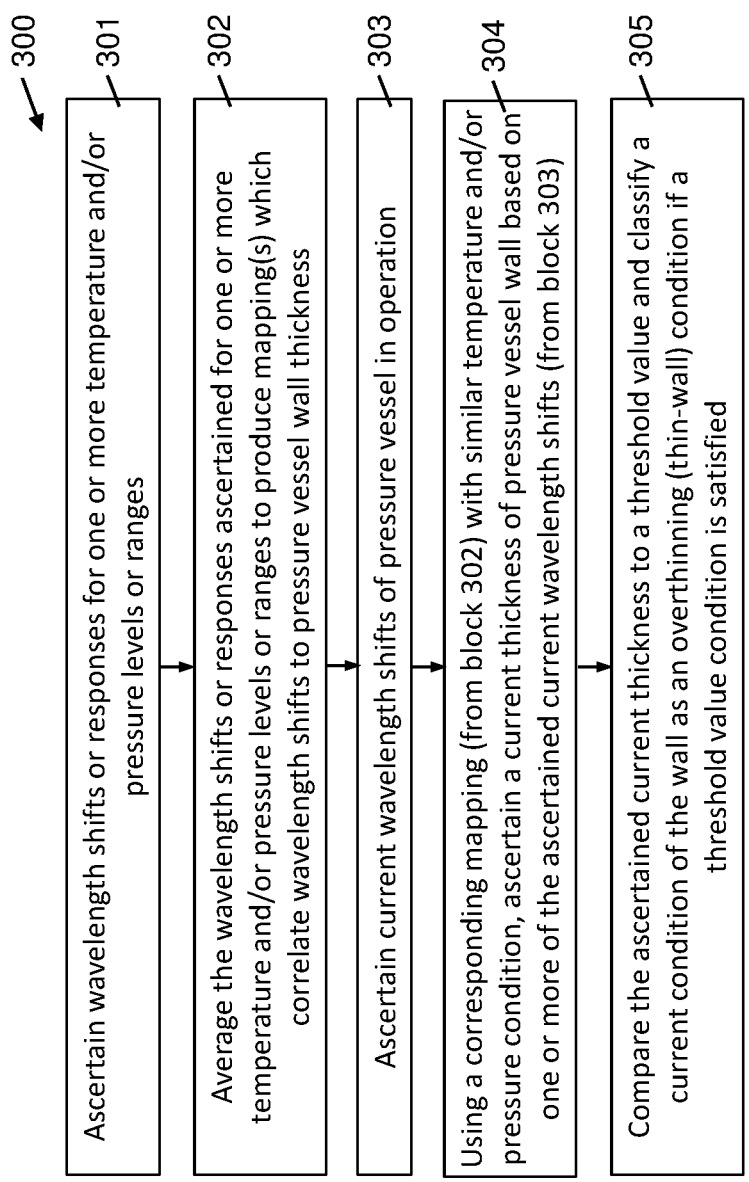
FIG. 3 shows a flow chart describing a method for estimating current thickness of wall and, optionally, classifying current condition of wall.

From scatter plots of various pressure conditions, mappings of wavelength shifts in respect of pressure vessel wall thickness can be obtained by averaging a moderate number of FBG sensor responses at relevant pressure levels to produce one or more predetermined mappings which may be utilised in method described by the flowchart of 300 in FIG. 3.

It is to be appreciated that a predetermined mapping may, in certain embodiments, include linear regression of the averaged wavelength shifts for one or more pressure conditions. In a predetermined mapping which shows a linear regression of wavelength shift with respect to thinning, the wavelength shift for a particular wall thickness will be higher at a higher operation pressure than at a lower operating pressure. Such predetermined mapping may be derived from FIG. 2C and/or similar plots of other pressure conditions. In particular, at a given amount of thinning, the FBG response is captured at a particular pressure and subtracted with a reference FBG response where pressure is, for example, 1 bar, and this is repeated for different thinning levels and different pressure levels, followed by a linear regression of the resulting values after subtraction. It is to be appreciated that an alternative of such mapping may be presented using empirical data, e.g. wavelength shift with respect to tube wall thickness.

In accordance with one method in view of FIGS. 2A to 2C, FIG. 3 shows a flow chart describing a method 300 of ascertaining at least one attribute of pressure vessel. In block 301, for one or more temperature and/or pressure levels or ranges, wavelength shifts are ascertained. In block 302, for one or more temperature and/or pressure levels or ranges, the wavelength shifts obtained in block 301 are averaged to produce mapping(s) which correlate wavelength shift to wall thickness or reduction thereof, e.g. FIGS. 2A to 2C. In block 303, current wavelength shifts of various FBG sensors on outer surface locations on a pressure vessel in operation are ascertained, e.g. in real-time. The current wavelength shifts may be obtained from a first FBG sensor disposed at a first outer surface location at a bend or non-bend portion of a pressure vessel being monitored, and a second or other FBG sensors disposed at other outer surface locations on a bend and/or non-bend portion of the pressure vessel. In block 304, using a corresponding mapping (predetermined from block 302) with similar temperature and/or pressure condition as current conditions of the pressure vessel being monitored, a current thickness at one or more outer surface location is ascertained, e.g. estimated, based on one or more ascertained current wavelength shifts from block 303.

In block 305, one or more ascertained current wavelength shifts from block 303, are compared against a threshold value and thereafter a current condition of the wall at the corresponding outer surface location(s) is classified into one or more classifications, e.g., an overthinning condition; non-overthinning condition, etc. Overthinning condition refers to a thin-wall or an abnormal condition wherein thickness of pressure vessel wall is below some threshold defined by the domain experts. Non-overthinning condition refers to a thick-wall or a normal condition wherein thickness of pressure vessel wall is above the threshold. A current condition of the wall at the corresponding outer surface location(s) is classified as an overthinning condition if a threshold condition is satisfied. For example, if a current wavelength shift is higher than a previous wavelength shift (as threshold value) of the corresponding FBG sensor or a predetermined threshold value, e.g. a minimum value, a current condition of the wall at the corresponding outer surface location is classified as an overthinning condition. The overthinning condition identifies an impending failure of the pressure vessel, which indicates the current thickness of pressure vessel wall has reached or approached abnormal level and which may generate appropriate alarm or notification to an operator of the pressure vessel. Otherwise, if the threshold condition is not satisfied, e.g. if the current wavelength shift is lower than or equal to the previous wavelength shift (as threshold value) of the corresponding FBG sensor or the predetermined threshold value, a current condition of the wall at the corresponding outer surface location is classified as a non-thinning or normal condition which indicates the current thickness of pressure vessel wall is within normal level.

It is to be appreciated that performance of block 305 is optional and depends on the attributes to be ascertained. It is also to be appreciated that estimating wall thickness may be performed for one or more outer surface locations having FBG sensors.

Attributes of pressure vessel wall may be classified without explicitly knowing the value of the environmental parameters, using sum-of-absolute-change in sensor response with respect to time and/or gradient of the sensor response with respect to time. In some other embodiments, current condition of pressure vessel wall may be classified into one or more classifications, e.g., an overthinning condition; non-overthinning condition, etc. Classification may be performed by computation and/or analysis of sum-of-absolute-change in sensor response with respect to time, and comparison of the sum with a threshold that suitably separates overthinning (thin-wall) condition and non-overthinning (thick-wall) condition. If a threshold condition is not satisfied, e.g. a computed sum-of-absolute-change value is lower than a threshold summation value, current condition of tube wall is classified as non-overthinning (thick-wall) condition (or in other words the wall thickness is broadly defined as thick); on the other hand, if a threshold condition is satisfied, e.g. a computed sum-of-absolute-change value is higher than a threshold summation value, current condition of tube wall is classified as overthinning (thin-wall) condition (or in other words the wall thickness is broadly defined as thin). Alternative to sum-of-absolute-change, classification may be performed by computation and/or analysis of gradient in sensor response with respect to time, and comparison of the gradient with a threshold that suitably separates overthinning (thin-wall) condition and non-overthinning (thick-wall) condition. If a threshold condition is not satisfied, e.g. a computed gradient value is higher than a threshold gradient value, current condition of the tube wall is classified as non-overthinning (thick-wall) condition (or in other words the wall thickness is broadly defined as thick); on the other hand, if a threshold condition is satisfied, e.g. a computed gradient value is lower than a threshold gradient value, current condition of tube wall is classified as overthinning (thin-wall) condition (or in other words the wall thickness is broadly defined as thin).

In the sum-of-absolute-changes in sensor response method, a summation of the absolute value of consecutive wavelength shifts or changes is computed, such as using the following formula $\Sigma_{i=1}^{n-1}|x_{i+1}-x_i|/n-1$, where x refers to wavelength shift or change and n refers to the number of FBG sensor readings in the time series. A sum-of-absolute-change in sensor response generally reflects the amount of fluctuation of time-series data (i.e., oscillation) and may be suitable for environmentally stable time period. FIG. 4A shows oscillations or fluctuations of wavelength shift with respect to time for larger wall thickness (thick tubes) while FIG. 4B shows oscillations or fluctuations of wavelength shift with respect to time for smaller wall thickness (thin tubes). FIG. 4C, derived from FIGS. 4A and 4B, shows summation of the absolute value of consecutive changes in sensor response (wavelength shift) with respect to wall thickness (before quantization of thickness). FIG. 4D shows the various summation values shown in FIG. 4C after quantization of thickness. It is to be appreciated from FIGS. 4A to 4D that a sum-of-absolute-change in sensor response of smaller wall thickness (thin tube) is greater or higher than a sum-of-absolute-change of sensor response in larger wall thickness (thick tube).

Figure 5:
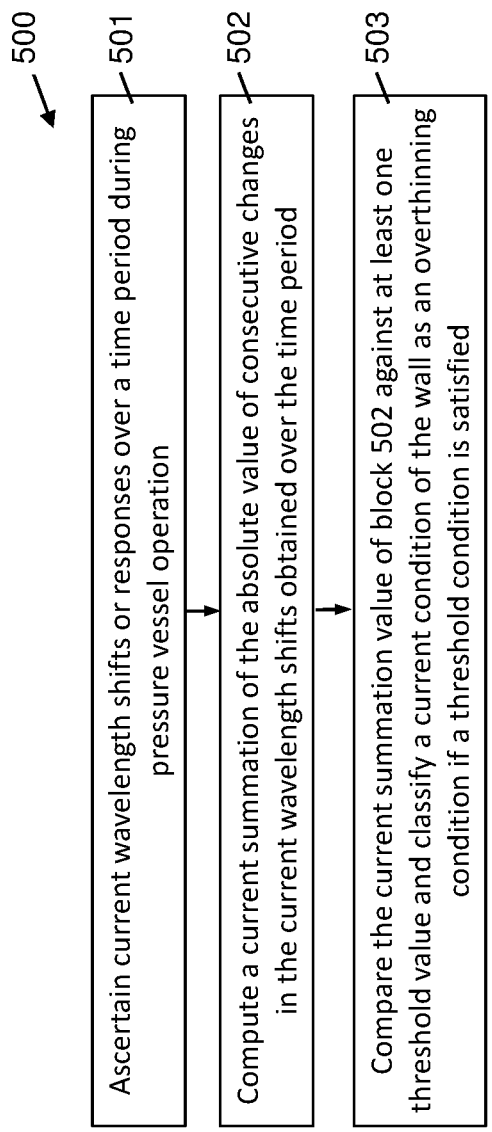
FIG. 5 shows a flow chart describing a method for classifying current condition of wall.

In accordance with one method in view of FIGS. 4A to 4D, FIG. 5 shows a flow chart describing a method 500 of classifying a current condition of pressure vessel wall, e.g. tube wall, as an overthinning (thin-wall) condition or a non-overthinning (thick-wall) condition. In block 501, current wavelength shifts are ascertained over a time period during pressure vessel operation to obtain a time series of current wavelength shifts of an FBG sensor. In block 502, a current summation of the absolute value of consecutive current wavelength shifts is computed based on the time series thereof. This computed current summation may alternatively be referred to as a derivative of the time series of current wavelength shifts. In block 503, the computed current summation value is compared against a threshold value and thereafter a current condition of the wall is classified as an overthinning or a non-overthinning condition depending on whether the threshold condition is satisfied. For example, if a current summation value is higher than at least one previous summation value (as threshold condition) in previous wavelength shift of the same FBG sensor, current condition of the wall is classified as overthinning condition, otherwise if a current summation value is lower than or equal to at least one previous summation value (as threshold condition) in previous wavelength shift of the same FBG sensor referred to in block 501, current condition of the wall is classified as non-overthinning condition. Alternatively, the threshold value may be predetermined by other methods, e.g. maximum summation value that may not be exceeded by the current summation value and may have been determined during initial set-up of the FBG sensor on the outer surface location or other appropriate time. The limitation of the threshold-based classification method of FIG. 5 is that it works well only if the testing environment parameters, e.g. temperature and pressure, are of similar value to the training environment from which the threshold condition is derived. It is to be appreciated that computing summation value and classifying current condition of wall may be performed for one or more outer surface locations having FBG sensors.

In the gradient of wavelength shift method, a gradient of wavelength shifts or changes is computed, such as using the following formula: $|x_{i+T}-x_i|/T$ wherein T=time period having rapid environmental changes, x refers to wavelength shift. A gradient of wavelength shifts generally reflects the speed and extent of time-series data in response to environmental change. FIG. 6A shows the speed and extent of wavelength shifts or changes with respect to time for larger wall thickness (thick tubes) while FIG. 6B shows the speed and extent of wavelength shifts or changes with respect to time for smaller wall thickness (thin tubes). FIG. 6C, derived from FIGS. 6A and 6B, shows a gradient of wavelength shifts with respect to wall thickness (before quantization of thickness). FIG. 6D shows the gradients shown in FIG. 6C after quantization of thickness. It is to be appreciated from FIGS. 6A to 6D that a gradient of wavelength shifts of smaller wall thickness (thin tube) is lower than a gradient of wavelength shifts of larger wall thickness (thick tube).

Figure 7:
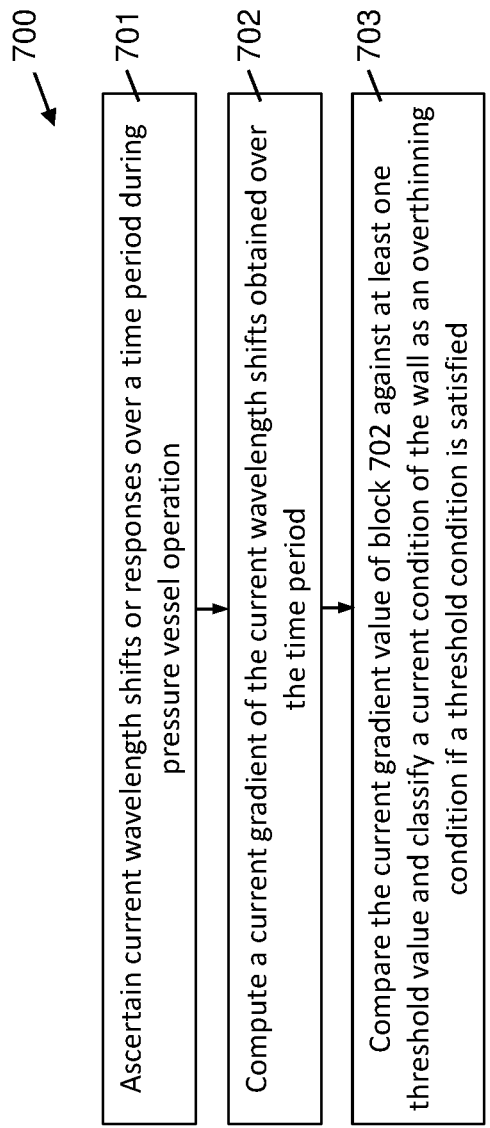
FIG. 7 shows a flow chart describing a method for classifying current condition of wall.

In accordance with one method in view of FIGS. 6A to 6D, FIG. 7 shows a flow chart describing a method 700 of classifying a current condition of pressure vessel wall as an overthinning (thin-wall) condition or a non-overthinning (thick-wall) condition. In block 701, current wavelength shifts are ascertained over a time period during pressure vessel operation to obtain a time series of current wavelength shifts of an FBG sensor. In block 702, a current gradient of wavelength shifts is computed based on the time series of the ascertained current wavelength shifts. This computed current gradient may alternatively be referred to as a derivative of the time series of current wavelength shifts. In block 703, the computed current gradient value is compared against a threshold value and thereafter a current condition of the wall is classified as an overthinning or a non-overthinning condition depending on whether the threshold condition is satisfied. For example, if a current gradient value is lower than at least one previous gradient value (as threshold value) of previous wavelength shift of the same FBG sensor, current condition of the wall is classified as overthinning condition, otherwise if a current gradient value is higher than or equal to at least one previous gradient value (as threshold value) of previous wavelength shift of the same FBG sensor referred to in block 701, current condition of the wall is classified as non-overthinning condition. Alternatively, the threshold value may be predetermined by other methods, e.g. minimum gradient value which current gradient value must not fall below and may have been determined during initial set-up of the FBG sensor on the outer surface location or other appropriate time. The limitation of the threshold-based classification method of FIG. 7 is that it works well only if the testing environment parameters, e.g. temperature and pressure, are of similar value of the training environment from which the threshold value is derived. It is to be appreciated that computing gradient value and classifying current condition of wall may be performed for one or more outer surface locations having FBG sensors.

FIGS. 4C and 6C may be combined to provide FIG. 8A. FIGS. 4D and 6D may be combined to provide FIG. 8B. FIGS. 8A and 8B show gradient of wavelength shifts with respect to sum-of-absolute-changes in wavelength shifts, before and after quantization of thickness respectively. It is to be appreciated from FIGS. 8A and 8B that larger wall thicknesses (thick tube) occupy the upper left region 801A, 801B of the illustrated dash line (threshold condition), while smaller wall thicknesses (thin tube) occupy the lower right region 802A, 802B of the dash line. Thus, classification of current condition of wall may be performed based on time series of the current wavelength shifts, with joint power from both ascertaining gradient of wavelength shifts and sum-of-absolute-changes in wavelength shifts. This enhances the reliability of classification result. The dash line illustrated in FIG. 8A or 8B may be referred to as a predetermined threshold line combining the gradient and the sum-of-absolute changes.

In accordance with one method in view of FIGS. 8A and 8B, FIG. 9 shows a flow chart describing a method 900 of classifying a current condition of tube wall as an overthinning (thin-wall) condition or a non-overthinning (thick-wall) condition. In block 901, current wavelength shifts are ascertained over a time period during pressure vessel operation to obtain a time series of current wavelength shifts. In block 902, as in block 502, a current summation of the absolute value of consecutive current wavelength shifts is computed based on a time series thereof. In block 903, as in block 702, a current gradient of wavelength shifts is computed based on the time series of the ascertained current wavelength shifts. In block 904, the computed current summation and the computed current gradient may be compared against a predetermined region of threshold values. Alternatively, a combination (as a two-dimensional point) of the computed current summation and the computed current gradient may be compared against a predetermined threshold line. Thereafter a current condition of the wall is classified as an overthinning or a non-overthinning condition depending on whether the threshold condition is satisfied. For example, if the combination of both computed values (as a two-dimensional point) falls within the predetermined region of threshold values, e.g. region 802A in FIG. 8A (if the thickness is not quantized) or 802B in FIG. 8B (if thickness is quantized), current condition of the wall is classified as overthinning condition, otherwise if the combination falls outside region 802A (if the thickness is not quantized) or 802B (if thickness is quantized) and/or fall within region 801A (if the thickness is not quantized) or 801B (if thickness is quantized), current condition of the wall is classified as non-overthinning condition. Alternatively, if the combination (as a two-dimensional point) of the computed current summation and the computed current gradient falls below the predetermined threshold line, e.g. dash line in FIG. 8A or 8B, current condition of the wall is classified as overthinning condition, otherwise if the combination is above the predetermined threshold line, e.g. dash line in FIG. 8A or 8B, current condition of the wall is classified as non-overthinning condition. It is to be appreciated that computing summation value and classifying current condition of wall may be performed for one or more outer surface locations having FBG sensors.

It is to be appreciated that the current summation and the current gradient may alternatively be referred to as a derivative of a time series of a current wavelength shift.

It is to be appreciated that the predetermined threshold condition for classifying current condition of the wall as overthinning or non-overthinning condition may be any one of the following: at least one previous summation of absolute changes in previous wavelength shift, at least one previous gradient of previous wavelength shift, at least one predetermined threshold value, e.g. determined during initial set-up or mounting of the FBG sensor at the pressure vessel, and a predetermined threshold line which may be computed from previous summation of absolute changes in previous wavelength shift and previous gradient of wavelength shift of previous wavelength shift.

Figure 10:
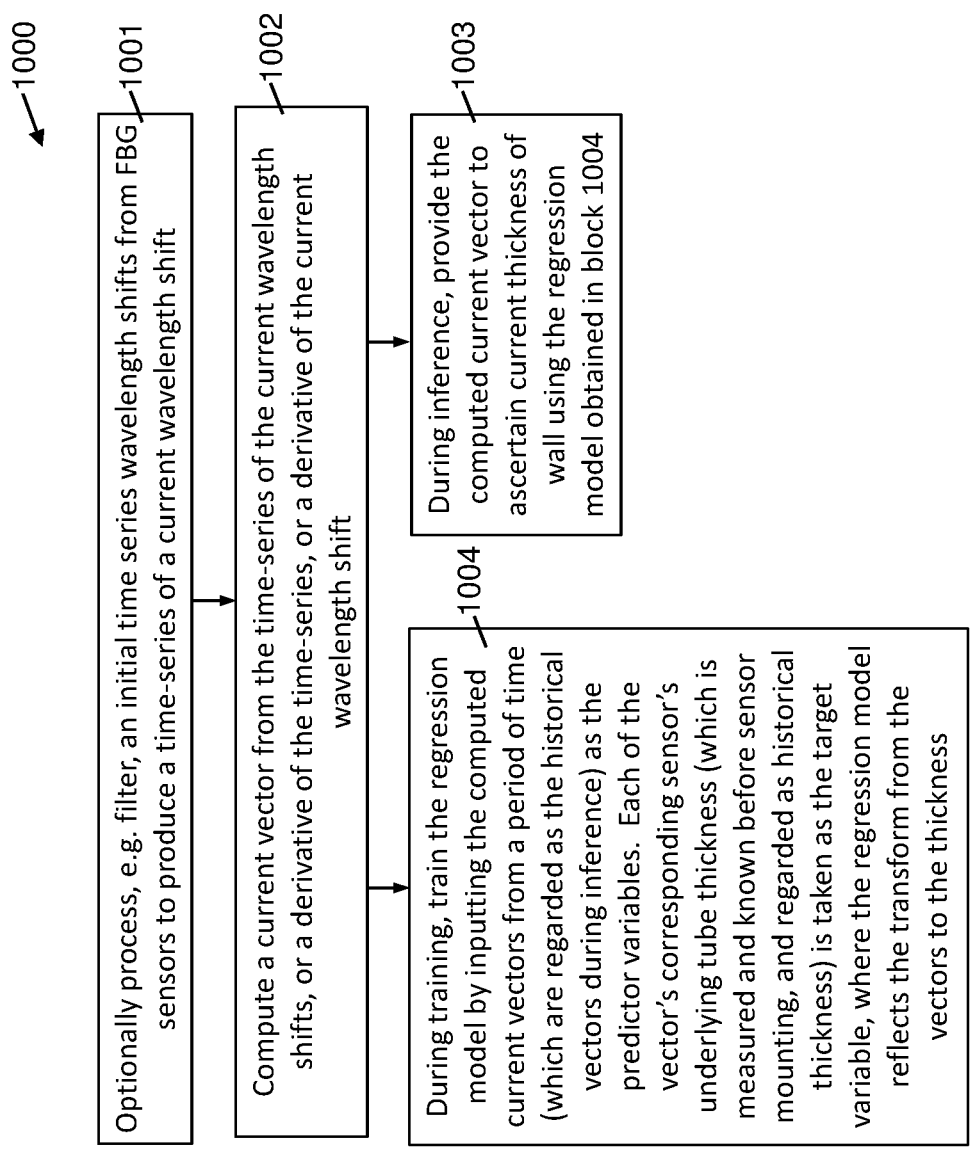
FIG. 10 shows a flow chart describing a method for ascertaining, e.g. estimating, current thickness of tube wall.

In some embodiments, thickness of pressure vessel wall, e.g. tube wall, may be ascertained or computed by performing a regression inference on output data received from FBG sensor. FIG. 10 shows a flow chart describing a method 1000 of ascertaining wall thickness. In block 1001, output data ascertained or received from at least one of the FBG sensors, e.g. the first FBG sensor disposed at bend or non-bend portion of pressure vessel. The output data, which may be in the form of an initial time-series shifts (whose values over a time period are treated as a vector), are processed to filter out environmental changes. The initial wavelength values, which may be in absolute wavelength values, may be subtracted by a baseline wavelength of the corresponding FBG sensor, to produce wavelength shifts. This processing of the initial time-series wavelength shifts is optional and may be performed by averaging the initial time-series wavelength shifts, or filtering the initial time-series wavelength shifts using a median filter, or filtering the initial time-series wavelength shifts using a low-pass filter. This processing of initial time series wavelength shifts produces a time-series of a current wavelength shift. In block 1002, a current vector may be computed from the time-series of the current wavelength shift which are obtained from block 1001. For example, if a current vector has a dimension of N, then a window of the time-series of the current wavelength shift consisting of N samples may be used to create the current vector, with each dimension's scalar value corresponding to a sample in the window of the time-series of the current wavelength shift, in a consecutive manner. Alternatively, in block 1002, the current vector may be computed from a derivative of the time series of the current wavelength shift, e.g. sum-of-absolute-changes and gradient; or a derivative of the current wavelength shift, e.g. current wavelength shift less off a reference value which may be obtained from a reference wavelength shift of a reference sensor.

In block 1003, the computed vector is provided to a predetermined regression model as input to the model. Using the regression model, a current thickness of wall at the outer surface location provided with aforesaid at least one of the FBG sensors is ascertained.

In block 1004, the predetermined regression model may be trained using previous or historical wavelength vectors, where each training item may be a historical vector obtained in the same processing manner as a current vector over a specified period of time and used as predictor values/variables of the regression model, and during which the historical vector's corresponding historical thickness is known, and where the regression target value/variable for a particular training item is the corresponding historical thickness. The historical thickness may be a thickness of wall established prior to mounting of FBG sensors thereon. The historical vector for the training item may go through processing step in block 1001, where the processed time-series wavelength shifts may be jointly derived from the historical vectors of wavelengths from both FBG monitoring sensors and reference sensors. In block 1001, the processed wavelength shifts may alternatively be computed gradient of wavelength shifts, computed sum-of-absolute-changes in wavelength shifts, or other descriptive statistics of the wavelengths. Any regression training method may be used, such as single-layer linear regression, or more sophisticated multi-layer regression using neural networks that work better where nonlinear relationship from wavelength vectors to thickness is present. It is to be appreciated that ascertaining current thickness of wall may be performed for one or more outer surface locations having FBG sensors.

In some embodiments, which may be employed in combination with any foregoing methods 300, 500, 700, 900 and 1000, a set of at least one reference sensor and/or a predetermined set of reference values may be used for comparison with the reading of the FBG sensors to further quantify the thickness value or thinning occurred at the outer surface location being considered. More particularly, the reference sensors and/or predetermined set of reference values seek to remove unwanted components, e.g. thermal strain on the outer surface of the pressure vessel (to allow only mechanical strain data be considered), pressure of fluid flowing in the pressure vessel, vibration on the outer surface of the pressure vessel. Specifically, in the aforesaid step(s) of, or equivalent to, ascertaining current wavelength shifts of FBG sensors, e.g. blocks 303, 501, 701, 901, and 1001, the step(s) include ascertaining an initial wavelength shift of the FBG sensor disposed on the tube, e.g. first outer surface location; removing thermal strain data from the current wavelength shift by computing a difference between the current wavelength shift and a reference value; and ascertaining the difference as a derivative of the current wavelength shift which is to be subsequently classified and/or quantified in respective later blocks. The reference value may be either predetermined from known values or ascertained from a reference wavelength shift of a reference sensor disposed at the first outer surface location or another outer surface location, e.g. proximate to the first outer surface location.

In embodiments where reference sensor(s) are employed, a reference sensor may be disposed in a direction which is substantially orthogonal to a direction of the FBG sensor. For example, the reference sensor may be disposed in a substantially longitudinal direction of the tube and while the monitoring FBG sensor may be disposed in a substantially radial direction of the tube. The reference sensor may be an optical sensor, or a thermocouple, or a vibration sensor.

Figure 11:
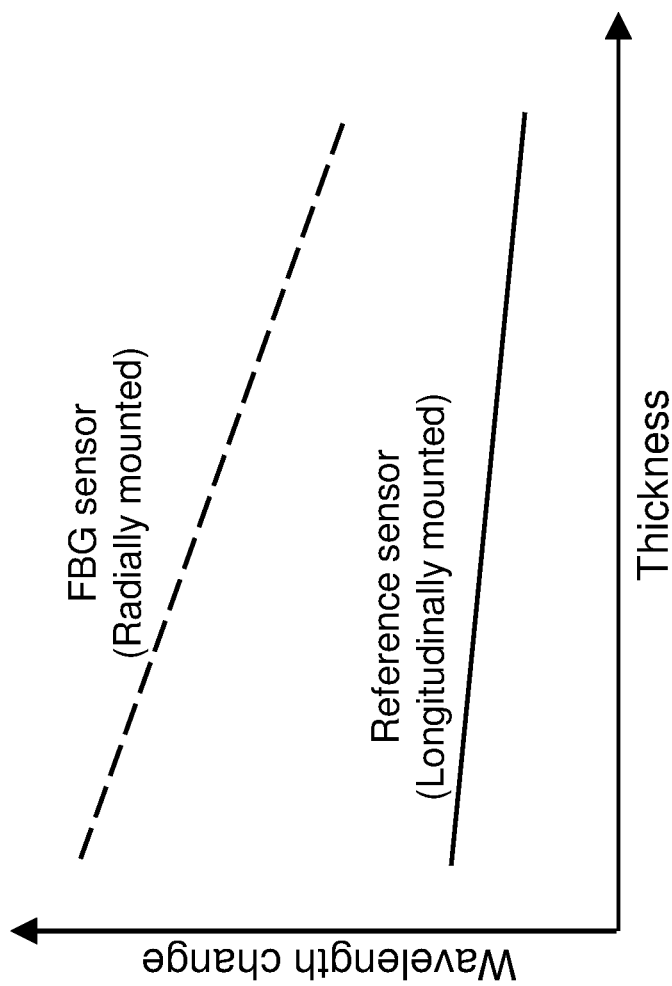
FIG. 11 shows wavelength shifts of FBG sensor and reference sensor with respect to thickness.

FIG. 11 shows wavelength shifts of radially-mounted FBG sensor and longitudinally-mounted reference (FBG) sensor with respect to thickness, according to some embodiments. At various conditions, including high temperature and room temperature conditions, the reduced pressure vessel wall thickness results in an increased wavelength shift. Although FIG. 11 shows a linear relationship between wavelength shift and thickness of tube wall, it is to be appreciated that the relationship between wavelength shifts and thickness of tube wall may be non-linear in certain examples. It is also to be appreciated that a difference between wavelength shift of the FBG sensor and of the reference sensor may be computed to remove thermal strain and thereby ascertained as a derivative of the current wavelength shift which is to be utilised in any of the methods 300, 500, 700, 900, 1000.

FBG sensor mounted in radial direction experiences compression while reference sensor mounted in longitudinal direction experiences expansion (Poisson's effect). Each FBG sensor captures a total of 'thermal and mechanical strain'. The reference sensor may be used to compensate for the thermal strain, i.e. computation of (total strain of FBG sensor—total strain of reference sensor) gives the effective mechanical strain. This effective mechanical strain may be used as an indicator of the structural deformation i.e. the wall thickness reduction. Accordingly, a pair of FBG sensors, e.g. one being disposed in radial direction and other being disposed in longitudinal direction, would reduce or cancel the common noise and increase the signal to noise ratio of the overall signal.

It is to be appreciated that in the above-described methods (at least in the flowcharts of FIGS. 3, 5, 7, 9 and 10), the steps of ascertaining current wavelength shifts (at least in blocks 301, 303, 501, 701, 901, 1001) may be performed by computing processor(s) or workstation(s) which may be in cooperation or communication coupling with, where appropriate, FBG sensors, FBG interrogator, communication network, or a combination thereof. The steps of averaging, comparing, classifying, ascertaining and training (at least in blocks 302, 304, 305, 502, 503, 702, 703, 902, 903, 1002, 1003, 1004) may be performed by computing processor(s) or workstation(s) which may be in cooperation or communication coupling with data storage or memory device(s) which store, where appropriate, the ascertained current wavelength shifts, previous wavelength shifts, predetermined mappings, computed summation, computed gradient, threshold values and regression model. It is to be appreciated that after a current thickness of pressure vessel wall is ascertained (at least in blocks 304, 1003) and/or after a current condition of pressure vessel wall is ascertained (at least in blocks 305, 503, 703, 904), the ascertained thickness value and/or condition may be stored in a data storage and/or communicated, by the computing processor(s) or workstation(s), to an operator or other party, e.g. by presentation through a user interface on a display device, by transmitting a notification to an appropriate receiving device.

In the above-described methods (at least in the flowcharts of FIGS. 3, 5, 7, 9 and 10), it is to be appreciated that if the ascertained current thickness value and/or current condition of pressure vessel wall identifies an overthinning condition, an alarm or appropriate notification may be generated, by the computing processor(s) or workstation(s), and communicated, by similar or other communication channel, to notify an operator or other party of an impending failure of the pressure vessel.

According to one aspect of the disclosure, a non-transitory computer-readable medium having computer-readable code executable by at least one processor is provided to perform the method/steps as described in the foregoing, e.g. methods 300, 500, 700, 900 and/or 1000.

Embodiments of the disclosure provide advantages including but not limited to the following.

(i) Continuous live or real-time monitoring of strain changes (for estimating tube thickness or reduction thereof) is provided while pressure vessel, e.g. tubes, are in operation in harsh environment. This may significantly reduce frequency and/or duration of downtime, e.g. plant shut down, whether unanticipated or needed for scheduled maintenance, as well as manpower required for maintenance.

(ii) An automated inspection mechanism is provided which reduces manpower needs.

(iii) Monitoring scheme does not only detect the defects automatically but also increases the speed of inspection. Accordingly, an otherwise undetected impending failure can be detected at a reasonable cost, thus reducing the occurrence of unscheduled maintenance.

(iv) More accurate ascertaining or estimating of thickness or thickness reduction (thinning) of pressure vessel wall, e.g. tube wall, are possible in real-time or near real-time speed.

(v) Embodiments may be applied to tubes or pipes of various diameters, particularly to small diameter (e.g. where outer diameter of the tube is in the range of tens of millimetres or below 10 centimetres, e.g. 38 mm), tube bends, and/or closely-spaced tubes.

(vi) An incremental learning approach, e.g. using combinations of the aforesaid embodiments, may be incorporated, to identify and investigate crucial explanatory failure causes, which can lead to more satisfactory detection performance.

To illustrate the method and system disclosed herein, a non-limiting list of embodiments is provided here:

Example 1 includes a method for ascertaining at least one attribute of pressure vessel wall, the method comprising:
while a pressure vessel, which comprises a wall having an outer surface and an inner surface, is operating:
ascertaining a current wavelength shift of a first fiber Bragg grating (FBG) sensor disposed at a first outer surface location on a bend of the pressure vessel; and
ascertaining a current condition and/or thickness of the wall at the first outer surface location on the bend based on the current wavelength shift or a derivative thereof.

Example 2 includes the method of claim 1, wherein ascertaining a current condition and/or thickness of the wall at the first outer surface location on the bend based on the current wavelength shift includes
using a predetermined mapping which correlates wavelength shift to wall thickness or reduction thereof, ascertaining the current thickness based on the current wavelength shift, wherein a temperature and/or pressure condition corresponding to the current wavelength shift is substantially similar to a temperature and/or pressure condition corresponding to the predetermined mapping.

Example 3 includes the method of Example 2, wherein ascertaining a current condition and/or thickness of the wall at the first outer surface location on the bend based on the current wavelength shift includes
classifying the current condition as an overthinning condition if the current wavelength shift satisfies a threshold condition, e.g. exceeds a threshold value, which is/includes a previous wavelength shift of the first FBG sensor or a predetermined threshold value, wherein the overthinning condition identifies an impending failure of the pressure value.

Example 4 includes the method of Example 2 or Example 3, wherein the predetermined mapping includes a first mapping of averaged wavelength shifts against wall thicknesses and/or a second mapping of linear regression of averaged wavelength shifts against wall thicknesses or reduction thereof.

Example 5 includes the method of Example 1 or Example 2, wherein ascertaining a current condition and/or thickness of the wall at the first outer surface location on the bend based on the current wavelength shift includes
computing a current summation of absolute changes in the current wavelength shift based on a time series thereof and classifying the current condition as an overthinning condition if the current summation satisfies a threshold condition, e.g. exceeds a threshold value which is at least one previous summation of absolute changes in previous wavelength shift of the first FBG sensor with respect to time or a predetermined threshold value, wherein the overthinning condition identifies an impending failure of the pressure vessel.

Example 6 includes the method of Example 1 or Example 2, wherein ascertaining a current condition and/or thickness of the wall at the first outer surface location on the bend based on the current wavelength shift includes
computing a current gradient of the current wavelength shift based on a time series thereof and classifying the current condition as an overthinning condition if the current gradient satisfies a threshold condition, e.g. is lower than a threshold value which is at least one previous gradient of previous wavelength shift of the first FBG sensor with respect to time or a predetermined threshold value, wherein the overthinning condition identifies an impending failure of the pressure vessel.

Example 7 includes the method of Example 1 or Example 2, wherein ascertaining a current condition and/or thickness of the wall at the first outer surface location on the bend based on the current wavelength shift includes
computing a current summation of absolute changes in the current wavelength shift based on a time series thereof;
computing a current gradient of the current wavelength shift based on the time series thereof; and
classifying the current condition as an overthinning condition if both the current summation and the current gradient satisfy a threshold condition, e.g. fall within a predetermined region of threshold values, wherein the overthinning condition identifies an impending failure of the pressure vessel.

Example 8 includes the method of Example 1, wherein ascertaining a current condition and/or thickness of the wall at the first outer surface location on the bend based on the current wavelength shift includes
computing the current thickness by:
computing a vector based on a time series of the current wavelength shifts, or a derivative of the time series, or a derivative of the current wavelength shift;
providing the vector to a predetermined regression model; and
using the regression model, ascertaining the current wall thickness.

Example 9 includes the method of any one of Example 5 to Example 8, wherein the time series of the current wavelength shifts is obtained from an initial time series of the current wavelength shifts by averaging the initial time series, or filtering the initial time series using a median filter, or filtering the initial time series using a low-pass filter.

Example 10 includes the method of Example 8, wherein ascertaining a current condition and/or thickness of the wall at the first outer surface location on the bend based on the current wavelength shift includes:
removing at least one unwanted component from the current wavelength shift by computing a difference between the current wavelength shift and a reference value which is either predetermined or ascertained from a reference wavelength shift of a reference sensor disposed at the first outer surface location on the bend of the pressure vessel; and
ascertaining the difference as the derivative of the current wavelength shift.

Example 11 includes the method of Example 10, wherein the at least one unwanted component is selected from the group consisting of thermal strain on the outer surface of the pressure vessel, pressure of fluid flowing in the pressure vessel, and vibration on the outer surface of the pressure vessel.

Example 12 includes the method of Example 10 or Example 11, wherein the reference sensor is disposed in a direction which is substantially orthogonal to a direction of the first FBG sensor.

Example 13 includes the method of Example 10 or Example 11, wherein the reference sensor is disposed in a substantially longitudinal direction of the pressure vessel and wherein the first FBG sensor is disposed in a radial direction of the pressure vessel.

Example 14 includes the method of any one of Example 10 to Example 13, wherein the reference sensor includes an optical sensor, or a thermocouple, or a vibration sensor.

Example 15 includes the method of any one of Example 1 to Example 14, wherein the bend includes an angle which is acute, orthogonal, obtuse, or about 45 degrees.

Example 16 includes the method of any one of Example 1 to Example 14, wherein the bend includes a U-bend.

Example 17 includes the method of any one of Example 1 to Example 14, wherein ascertaining the current condition and/or thickness of the wall at the first outer surface location on the bend based on the current wavelength shift includes
ascertaining other current wavelength shifts of other FBG sensors which are disposed at other outer surface locations on the pressure vessel; and
wherein ascertaining the current condition and/or thickness of the wall at the first outer surface location on the bend based on the current wavelength shift includes ascertaining other current conditions and/or thicknesses of the wall at the other outer surface locations based on the other current wavelength shifts.

Example 18 includes a system for ascertaining at least one attribute of pressure vessel wall, the system comprising:
a plurality of fiber Bragg grating (FBG) sensors which are disposed at outer surface locations on a pressure vessel which comprises a wall having an outer wall and an inner wall, wherein the FBG sensors include a first FBG sensor disposed at a first outer surface location on a bend of the pressure vessel;
a computing processor or workstation which is communicably coupled to the FBG sensors, wherein the computing processor or workstation is configured to: while the pressure vessel is operating:
ascertain a current wavelength shift of a first fiber Bragg grating (FBG) sensor disposed at a first outer surface location on a bend of the pressure vessel; and
ascertain a current condition and/or thickness of the wall at the first outer surface location on the bend based on the current wavelength shift or a derivative thereof.

Example 19 includes the system of Example 18, wherein the computing processor or workstation is further configured to:
using a predetermined mapping which correlates wavelength shift to wall thickness or reduction thereof, ascertain the current thickness based on the current wavelength shift, wherein a temperature and/or pressure condition corresponding to the current wavelength shift is substantially similar to a temperature and/or pressure condition corresponding to the predetermined mapping.

Example 20 includes the system of Example 19, wherein the computing processor or workstation is further configured to:
classify the current condition as an overthinning condition if the current wavelength shift satisfies a threshold condition, e.g. exceeds a threshold value which is a previous wavelength shift of the first FBG sensor or a predetermined threshold value, wherein the overthinning condition identifies an impending failure of the pressure vessel.

Example 21 includes the system of Example 19 or Example 20, wherein the predetermined mapping includes a first mapping of averaged wavelength shifts against wall thicknesses and/or a second mapping of linear regression of averaged wavelength shifts against wall thicknesses or reduction thereof.

Example 22 includes the system of Example 18, wherein the computing processor or workstation is further configured to:
compute a current summation of absolute changes in the current wavelength shift based on a time series thereof and classifying the current condition as an overthinning condition if the current summation satisfies a threshold condition, e.g. exceeds a threshold value which is at least one previous summation of absolute changes in previous wavelength shift of the first FBG sensor with respect to time or a predetermined threshold value, wherein the overthinning condition identifies an impending failure of the pressure vessel.

Example 23 includes the system of Example 18 or Example 19, wherein the computing processor or workstation is further configured to:
compute a current gradient of the current wavelength shift based on a time series thereof and classifying the current condition as an overthinning condition if the current gradient satisfies a threshold condition, e.g. is lower than a threshold value which is at least one previous gradient of previous wavelength shift of the first FBG sensor with respect to time or a predetermined threshold value, wherein the overthinning condition identifies an impending failure of the pressure vessel.

Example 24 includes the system of Example 18 or Example 19, wherein the computing processor or workstation is further configured to:
compute a current summation of absolute changes in the current wavelength shift based on a time series thereof;
compute a current gradient of the current wavelength shift based on the time series thereof; and
classify the current condition as an overthinning condition if both the current summation and the current gradient satisfy a threshold condition, e.g. fall within a predetermined region of threshold values, wherein the overthinning condition identifies an impending failure of the pressure vessel.

Example 25 includes the system of Example 18, wherein the computing processor or workstation is further configured to:
compute the current thickness by:
computing a vector based on a time series of the current wavelength shifts, or a derivative of the time series, or a derivative of the current wavelength shift;
providing the vector to a predetermined regression model; and
ascertaining the current wall thickness using the regression model.

Example 26 includes the system of any one of Example 22 to Example 25, wherein the computing processor or workstation is further configured to:
obtain the time series of the current wavelength shifts from an initial time series of the current wavelength shifts by averaging the initial time series, or filtering the initial time series using a median filter, or filtering the initial time series using a low-pass filter.

Example 27 includes the system of Example 25, wherein the computing processor or workstation is further configured to:
remove at least one unwanted component from the initial wavelength shift by computing a difference between the initial wavelength shift and a reference value which is either predetermined or ascertained from a reference wavelength shift of a reference sensor disposed at the first outer surface location on the bend of the pressure vessel; and
ascertain the difference as the derivative of the current wavelength shift.

Example 28 includes the system of Example 27, wherein the at least one unwanted component is selected from the group consisting of thermal strain on the outer surface of the pressure vessel, pressure of fluid flowing in the pressure vessel, and vibration on the outer surface of the pressure vessel.

Example 29 includes the system of Example 27 or Example 28, wherein the reference sensor is disposed in a direction which is substantially orthogonal to a direction of the first FBG sensor.

Example 30 includes the system of Example 27 or Example 28, wherein the reference sensor is disposed in a substantially longitudinal direction of the pressure vessel and wherein the first FBG sensor is disposed in a substantially radial direction of the pressure vessel.

Example 31 includes the system of any one of Example 27 to Example 30, wherein the reference sensor includes an optical sensor, or a thermocouple, or a vibration sensor.

Example 32 includes the system of any one of Example 18 to Example 31, wherein the bend includes an angle which is acute, orthogonal, obtuse, or about 45 degrees.

Example 33 includes the system of any one of Example 18 to Example 31, wherein the bend includes a U-bend.

Example 34 includes the system of any one of Example 18 to Example 33, wherein the computing processor or workstation is configured to:
ascertain other current wavelength shifts of the FBG sensors other than the first FBG sensor which are disposed at other outer surface locations on the pressure vessel; and
ascertain other current conditions and/or thicknesses of the wall at the other outer surface locations based on the other current wavelength shifts.

Example 35 includes a non-transitory computer-readable medium having computer-readable code executable by at least one computer processor to perform the method according to any one of Examples 1 to 17.

Other embodiments will be apparent to those skilled in the art from consideration of the specification and practice of the disclosure. Furthermore, certain terminology has been used for the purposes of descriptive clarity, and not to limit the disclosed embodiments. The embodiments and features described above should be considered exemplary.

The invention claimed is:

1. A method for ascertaining at least one attribute of pressure vessel wall, the method comprising:
while a pressure vessel, which comprises a wall having an outer surface and an inner surface, is operating:
ascertaining a current wavelength shift of a first fiber Bragg grating (FBG) sensor disposed at a first outer surface location on the pressure vessel; and
ascertaining a current thickness of the wall at the first outer surface location by:
computing a vector based on a time series of the current wavelength shift, or a derivative of the time series, or a derivative of the current wavelength shift;
providing the vector to a predetermined regression model; and
using the regression model, ascertaining the current thickness of the wall; and
ascertaining a current condition of the wall at the first outer surface location by:
based on the time series of the current wavelength shift, computing a current summation of absolute changes thereof of the time series of the current wavelength shift and/or a current gradient thereof of the time series of the current wavelength shift; and
classifying the current condition as an overthinning condition if the current summation, or the gradient, or a combination of the current summation and the gradient satisfies a threshold condition which is selected from the group consisting of at least one previous summation of absolute changes in previous wavelength shift of the first FBG sensor, at least one previous gradient of previous wavelength shift of the first FBG sensor, at least one predetermined threshold value, and a predetermined threshold line, wherein the overthinning condition identifies an impending failure of the pressure vessel.

2. The method of claim 1, wherein the time series of the current wavelength shift is obtained from an initial time series of the current wavelength shift by averaging the initial time series or filtering the initial time series using a median filter, or filtering the initial time series using a low-pass filter.

3. The method of claim 1, wherein computing a vector based on a time series of the current wavelength shift, or a derivative of the time series, or a derivative of the current wavelength shift comprises:
- removing at least one unwanted component from the current wavelength shift by computing a difference between the current wavelength shift and a reference value which is either predetermined or ascertained from a reference wavelength shift of a reference sensor disposed at the first or another outer surface location of the pressure vessel; and
- ascertaining the difference as the derivative of the current wavelength shift.

4. The method of claim 3, wherein the at least one unwanted component is selected from the group consisting of thermal strain on the outer surface of the pressure vessel, pressure of fluid flowing in the pressure vessel, and vibration on the outer surface of the pressure vessel.

5. The method of claim 3, wherein the reference sensor is disposed in a direction which is substantially orthogonal to a direction of the first FBG sensor, or wherein the reference sensor is disposed in a substantially longitudinal direction of the pressure vessel and the first FBG sensor is disposed in a substantially radial direction of the pressure vessel.

6. The method of claim 1, wherein the first outer surface location is provided at a bend or U-bend of the pressure vessel.

7. The method of claim 1, wherein the pressure vessel is a tube.

8. A system for ascertaining at least one attribute of pressure vessel wall, the system comprising:
- a plurality of fiber Bragg grating (FBG) sensors which are disposed at outer surface locations on a pressure vessel which comprises a wall having an outer surface and an inner surface, wherein the FBG sensors include a first FBG sensor disposed at a first outer surface location on the pressure vessel; and
- a computing processor which is communicably coupled via a communication network to the FBG sensors, wherein the computing processor is configured to:
- while the pressure vessel is operating:
  - ascertain a current wavelength shift of the first FBG; and
  - ascertain a current thickness of the wall at the first outer surface location by:
    - computing a vector based on a time series of the current wavelength shift, or a derivative of the time series, or a derivative of the current wavelength shift;
    - providing the vector to a predetermined regression model; and
    - using the regression model, ascertaining the current thickness of the wall; and
  - based on the time series of the current wavelength shift, compute a current summation of absolute changes thereof and/or a current gradient thereof; and
  - classify the current condition as an overthinning condition if the current summation, or the gradient, or a combination of the current summation and the gradient satisfies a threshold condition which is selected from the group consisting of at least one previous summation of absolute changes in previous wavelength shift of the first FBG sensor, at least one previous gradient of previous wavelength shift of the first FBG sensor, at least one predetermined threshold value, and a predetermined threshold line, wherein the overthinning condition identifies an impending failure of the pressure vessel.

9. The system of claim 8, wherein the computing processor is further configured to:
- obtain the time series of the current wavelength shift from an initial time series of the current wavelength shift by averaging the initial time series, or filtering the initial time series using a median filter, or filtering the initial time series using a low-pass filter.

10. The system of claim 8, wherein the computing processor is further configured to:
- remove at least one unwanted component from the current wavelength shift by computing a difference between the current wavelength shift and a reference value which is either predetermined or ascertained from a reference wavelength shift of a reference sensor disposed at the first or another outer surface location on the pressure vessel; and
- ascertain the difference as the derivative of current wavelength shift.

11. The system of claim 10, wherein the at least one unwanted component is selected from the group consisting of thermal strain on the outer surface of the pressure vessel, pressure of fluid flowing in the pressure vessel, and vibration on the outer surface of the pressure vessel.

12. The system of claim 10, wherein the reference sensor is disposed in a direction which is substantially orthogonal to a direction of the first FBG sensor, or wherein the reference sensor is disposed in a substantially longitudinal direction of the pressure vessel and the first FBG sensor is disposed in a substantially radial direction of the pressure vessel.

13. The system of claim 7, wherein the first outer surface location is provided on a bend or U-bend on the pressure vessel.

14. The system of claim 8, wherein the pressure vessel is a tube.

15. A non-transitory computer-readable medium having computer-readable code executable by at least one processor to perform the method according to claim 1.

* * * * *